United States Patent
Chen et al.

(10) Patent No.: US 10,336,118 B2
(45) Date of Patent: Jul. 2, 2019

(54) INKJET PRINTERS

(71) Applicant: Hewlett-Packard Development Company, L.P., Fort Collins, CO (US)

(72) Inventors: Tao Chen, San Diego, CA (US); Xulong Fu, San Diego, CA (US); Haowen Yu, San Diego, CA (US)

(*) Notice: Subject to any disclaimer, the term of this patent is extended or adjusted under 35 U.S.C. 154(b) by 0 days.

(21) Appl. No.: 15/763,663

(22) PCT Filed: Dec. 3, 2015

(86) PCT No.: PCT/US2015/063739
§ 371 (c)(1),
(2) Date: Mar. 27, 2018

(87) PCT Pub. No.: WO2017/095417
PCT Pub. Date: Jun. 8, 2017

(65) Prior Publication Data
US 2018/0272782 A1   Sep. 27, 2018

(51) Int. Cl.
*B41J 11/00* (2006.01)
*B41M 7/00* (2006.01)
(Continued)

(52) U.S. Cl.
CPC .......... *B41M 7/0036* (2013.01); *B41J 11/00* (2013.01); *B41J 11/002* (2013.01);
(Continued)

(58) Field of Classification Search
CPC ..... B41J 11/0005; B41J 11/0015; B41J 11/00; B41J 11/002; B41M 7/0018; B41M 7/0036; C09D 11/30; C09D 11/40; C09D 11/54
See application file for complete search history.

(56) References Cited

U.S. PATENT DOCUMENTS

| | | | | |
|---|---|---|---|---|
| 4,372,800 A | * | 2/1983 | Oizumi | ................ B29C 70/50 |
| | | | | 156/307.3 |
| 5,693,129 A | | 12/1997 | Lin | |

(Continued)

FOREIGN PATENT DOCUMENTS

| JP | 2008255242 | 10/2008 |
|---|---|---|
| JP | 2010212419 | 9/2010 |

OTHER PUBLICATIONS

International Search Report dated Sep. 1, 2016 for PCT/US2015/063739, Applicant Hewlett-Packard Development Company, L.P.

*Primary Examiner* — Anh T Vo
(74) *Attorney, Agent, or Firm* — Thorpe North & Western LLP

(57) ABSTRACT

An inkjet printer can include an inkjet printhead to print an image on a print medium, and a dryer to reduce or remove moisture from the image. A post-printing treatment fluid can also be present which can include water and a flatness control agent, the flatness control agent including an organic solvent with three or more hydroxyl groups, and a vapor pressure less than $2 \times 10^{-4}$ mmHg. A fluid dispenser can be included to apply the post-printing treatment fluid on the print medium after the moisture from the image is reduced or removed. Additionally, the printer can include a mechanical calendering device to apply pressure to the print medium after application and while the print medium is still moistened by the post-printing treatment fluid.

15 Claims, 2 Drawing Sheets

(51) Int. Cl.
*C09D 11/54* (2014.01)
*C09D 11/30* (2014.01)
*C09D 11/40* (2014.01)

(52) U.S. Cl.
CPC ........ *B41J 11/0005* (2013.01); *B41J 11/0015* (2013.01); *B41M 7/0018* (2013.01); *C09D 11/30* (2013.01); *C09D 11/40* (2013.01); *C09D 11/54* (2013.01)

(56) References Cited

U.S. PATENT DOCUMENTS

| | | |
|---|---|---|
| 5,916,418 A | 6/1999 | Frank et al. |
| 7,192,472 B2 | 3/2007 | Hermansky |
| 7,705,069 B2 | 4/2010 | Reinhardt et al. |
| 9,109,129 B2 | 8/2015 | Goto et al. |
| 2005/0172855 A1 | 8/2005 | Iijima et al. |
| 2006/0055757 A1* | 3/2006 | Yamashita ............. B41J 11/002 347/102 |
| 2011/0069109 A1 | 3/2011 | Tojo |
| 2011/0211012 A1* | 9/2011 | Irita ...................... B41J 2/2114 347/20 |
| 2014/0141212 A1 | 5/2014 | Fu et al. |
| 2015/0241804 A1* | 8/2015 | Takahashi ............ G03G 9/0819 430/108.4 |
| 2015/0336400 A1 | 11/2015 | Swei et al. |

\* cited by examiner

INKJET PRINTERS

BACKGROUND

Low weight book paper or other low weight paper used for inkjet printing, such as HP PageWide web press printing, which uses aqueous inks can be susceptible to waviness or cockling of the print media after the inkjet produced images are dried. This can be caused by several factors, including high printing speeds and/or non-uniform printing content. As the paper absorbs moisture, it tends to expand. In further detail, this expansion of the paper in areas localized where printing ink has been applied, particularly when not uniform across the paper web, often causes localized paper buckling or waviness after drying. Furthermore, in some situations where a drying or heat cycle is used, such drying may rob the print media itself of moisture while drying the printed image to a different degree or at a different speed. This can freeze this undesirable waviness or cockling into the printed media.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

DETAILED DESCRIPTION

Figure 1:
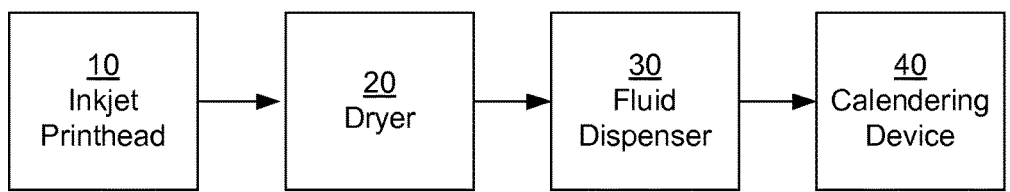
FIG. 1 illustrates a block diagram of an inkjet printer having a printhead, a dryer, a fluid dispenser for dispensing post-printing treatment fluid, and a calendering device in accordance with examples of the present disclosure.

In accordance with examples of the present disclosure, an inkjet printer, a method of printing, and a fluid set is disclosed herein. The inkjet printer can include an inkjet printhead to print an image on a print medium, a dryer to reduce or remove moisture from the image, a fluid dispenser to apply a post-printing treatment fluid on the print medium after the moisture from the image is reduced or removed, and a mechanical calendering device to apply pressure/heat to the print medium after application and while the print medium is still moistened by the post-printing treatment fluid. The post-printing treatment fluid can include water and a flatness control agent. The flatness control agent can include an organic solvent with three or more hydroxyl groups, and a vapor pressure less than $2\times10^{-4}$ mmHg.

In another example, a method of printing can include inkjet printing an image on a print medium, and reducing or removing moisture from the image. The method can further include dispensing post-printing treatment fluid on the print medium after reducing or removing the moisture. The post-printing treatment fluid can include water and a flatness control agent which includes an organic solvent with three or more hydroxyl groups, and a vapor pressure less than $2\times10^{-4}$ mmHg. The method can also include calendering the print medium while the print medium is still moistened with the post-printing treatment fluid.

In another example, a fluid set for inkjet printing can include an inkjet ink, and a post-printing treatment fluid comprising water and a flatness control agent. The flatness control agent can include an organic solvent with three or more hydroxyl groups, and a vapor pressure less than $2\times10^{-4}$ mmHg.

It is noted that when discussing the present inkjet printers, methods, and fluid sets, each of these discussions can be considered applicable to each of these examples, whether or not they are explicitly discussed in the context of that specific example. Thus, for example, in discussing post-printing treatment fluid related to a inkjet printer, such a composition is also relevant to and directly supported in the context of the method and/or fluid set, and vice versa.

With this in mind, there are several details related to the post-printing treatment fluid. As mentioned, the fluid can be a solution or fine dispersion of an organic solvent (or flatness control agent) with three or more hydroxyl groups, and a vapor pressure less than $2\times10^{-4}$ mmHg. In certain examples, the flatness control agent can have a molecular weight less than 1500 Da, less than 1200, less than 500 Da, or less than 200 Da. In one example, the flatness control agent can be included in the post-printing treatment fluid at a concentration from 1 wt % to 15 wt %. In another example, the flatness control agent can be present at from 2 wt % to 8 wt %. In yet another example, the flatness control agent can be present at from 4 wt % to 6 wt %. The solvent in the post-printing treatment fluid can be primarily water, and in some examples, the fluid can consist essentially of or consist of water and the flatness control agent.

As mentioned, the volatility of the flatness control agent is very low, i.e. vapor pressure less than $2\times10^{-4}$ mmHG. This has the ability to disrupt cellulose fiber-to-fiber H-bonding that can disrupt media uniformity when printing on select portions of a media substrate (and subsequently drying). Thus, essentially by relaxing the media fibers, the flatness control agent can reduce this non-uniformity of the paper expansion.

Examples of suitable flatness control agents include organic solvents such as 2-ethyl-2-(hydroxymethyl)-1,3-propanediol (EHPD), 3-methyl-1,3,5-pentanetriol, LEG-1, or glycerol, for example.

When applying the flatness control agent to the printed media, in certain examples, the amount of the post-printing treatment fluid dispensed can be an amount that provides a dry coat weight on the print medium of about 0.01 gsm to about 5.0 gsm, of about 0.01 to 2 gsm, or about 0.1 to 2 gsm. The flatness control agent can be applied by any suitable coating method known in the art, such as rod coating, curtain coating, blade coating, roll coater, spray coater, or the like. In one example, the post-printing treatment fluid can be integrated or used with a moisturizer in a moisturizing zone of an inline printer assembly, or using a moisturizer that is separate from the printer.

In conjunction with the application of the post-printing treatment fluid, pressure can be applied to the imaged print media. For example, a mechanical calendering device, such an assembly of one or more rollers (often two or more rollers), can be used to apply light nip pressure to the image printed medium. In one example, the nip pressure can be pressure ranging from 500 psi to 3000 psi, from 500 psi to 2000 psi, or from 700 psi to 1500 psi. The temperature during calendering can be room temperature, i.e. about 21°

C., in one example. In another example, the temperature can be increased to greater than room temperature to 150 C. In yet another example, the temperature range can be from 30° C. to 150° C., or from 40° C. to 100° C.

Turning now to the device that is used to generate the printed images described herein, otherwise referred to as the inkjet printer or inkjet printing device, there are several structural features included in the device. FIG. 1 shows one example of an inkjet printer in accordance with the present technology. There, the inkjet printer can include a printhead 10 used to inkjet ink onto a print medium or media substrate to generate an image. The inkjet ink can be any inkjet ink suitable for imaging print media, including pigment- or dye-based ink. After printing, the printer is configured to send the imaged print medium to a dryer 20 to dry and/or cure the imaged print medium. It is noted that the term "dryer" does not infer mere drying using heat, forced air, lamps, etc., but rather also includes "drying" systems where curing occurs in addition to removal of moisture from the printed image. In many instances, the combination of inkjet printing and drying/curing can lead to paper waviness or cockling. Thus, in accordance with examples of the present disclosure, the imaged and dried or partially dried print medium is treated with the post-printing treatment fluid described herein which is dispensed from a fluid dispenser 30. After moistening (or re-moistening) the print medium, which includes the printed image, the print medium can be mechanically flattened using a mechanical calendering device 40. Notably, regarding the inkjet printer described herein, typically, the print media is moved from one zone to the next where each stage occurs, e.g., printing, drying/curing, fluid treatment, calendering pressure treatment, heat, etc. Media conveyers, roll-to-roll, or other systems can be used to carry out this task. Furthermore, the inkjet printer can be a high speed inkjet printer with media feed rates of at least 100 feet per minute, or at least 400 feet per minute.

In further detail regarding the dryer 20, in embodiments where heat is used to remove moisture from the image for example, the imaged print medium can typically enter the dryer and is subjected to a relatively high air temperature (e.g., from about 70° C. to about 200° C., or higher) so that the ink image is dried in a relative short period of time during the printing process. Lower temperatures can likewise be used as may be appropriate for a specific media type and/or ink. As a result, moisture levels in the printed media can be very low upon exiting the dryer, e.g., less than about 2 wt % or less than 1 wt % moisture content may be left in paper media after drying. Thus, when waviness or cockling is undesirably introduced to the print medium. The post-printing treatment fluid and calendering device restores desired flatness to the print medium. Furthermore, because of the water content in the post-printing treatment fluid, in one example, this can also act as a moisturizer for the dried printed media to reintroduced a temporary desired level of moisture, e.g., to about 2% to about 4%, which is helpful for flattening the imaged print medium as well.

It is also noted that though there is a dryer that is used after printing, a second dryer can also be present that is used coincident with, after, or even in-line after calendering/pressure treating the newly flattened print medium (with or without added heat).

Figure 2:
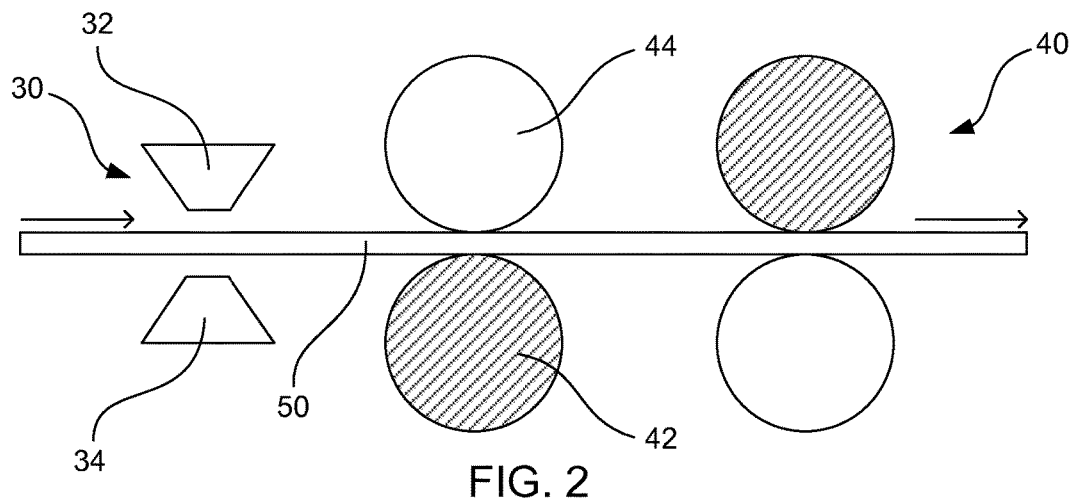
FIG. 2 illustrates an exemplary arrangement of the fluid dispenser and the calendering device of FIG. 1 in accordance with examples of the present disclosure.
Figure 3:
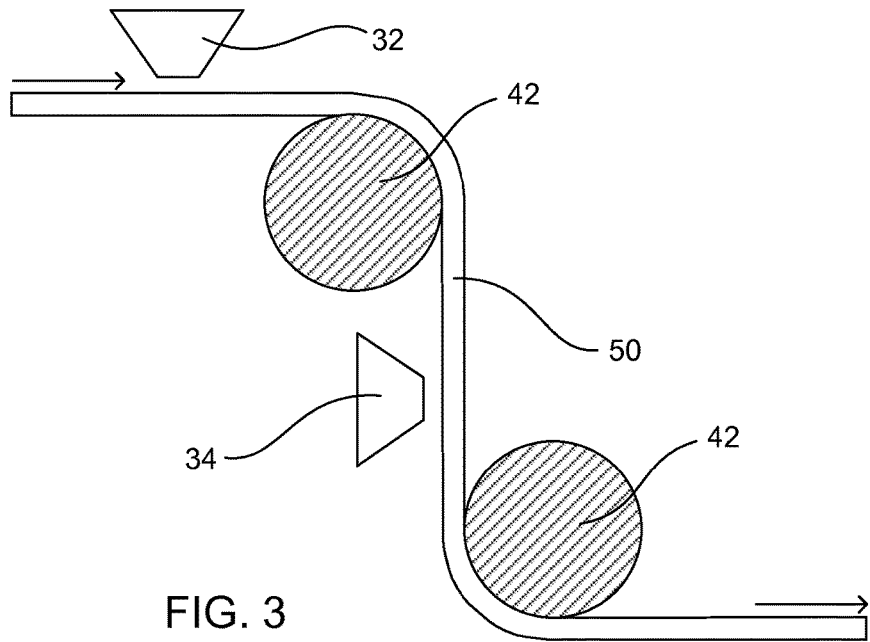
FIG. 3 illustrates another exemplary arrangement of the fluid dispenser and the calendering device of FIG. 1 in accordance with examples of the present disclosure.

Turning now to FIGS. 2 and 3, two examples are shown that relate specifically to fluid dispenser 30 and calendering device 40 of FIG. 1. More specifically, in FIG. 2, a print medium 50 is shown as it passes by the fluid dispenser 30. In this example, there is a first side fluid dispenser 32 and a second side fluid dispenser 34. Thus, this particular printer is set up for possible duplex printing where both sides can be moistened by the post-printing treatment fluid. After fluid application, the print medium subsequently passes through the calendering device 40, which in this example comprises a two pairs of rollers. Each pair (one pair designed for each of the first and second surfaces) includes a front metal roller 42, which is inflexible, for applying pressure to the printed surface; and a back rubber roller 44, which is flexible, for providing support and pressure to the "back" of the print medium. The terms "front" and "back" are relative terms depending on the printed surface being calendered. In this example, as there are two sets of rollers, proper calendering can be applied to printed images on both sides of the print medium. In one example, the metal rollers can be set at room temperature, or at a temperature above room temperature, e.g. up to 150° C.

Referring now to FIG. 3, a print medium 50 is shown as it passes by the fluid dispenser 30. In this example, there is a first side fluid dispenser 32 and a second side fluid dispenser 34. Again, this particular printer is set up for possible duplex printing where both sides can be moistened by the post-printing treatment fluid. After fluid application, the print medium subsequently passes through the calendering device 40, which in this example comprises a single inflexible metal roller 42 for each side of the print medium. Thus, tension of the print medium is used in conjunction with the roller to calender the surface of the imaged print medium. In one example, the metal rollers can be set at room temperature, or at a temperature above room temperature, e.g. up to 150° C.

With specific reference to the print medium or media that can be used, the media can be used that includes natural cellulosic material; synthetic cellulosic material (such as, for example, cellulose diacetate, cellulose triacetate, cellulose propionate, cellulose butyrate, cellulose acetate butyrate and/or nitrocellulose); material comprising including, but not limited to, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, and/or polyvinyl pyrrolidones. In some examples, the media substrate comprises a paper base including, but not limited to, paper stock, cardboard, paperboard, or paper laminated with plastics or coatings. Combinations of these materials can be present in the print media. Essentially, any print media that is susceptible to exhibiting waviness and/or cockling upon printing an ink thereon and drying can benefit from the application of the post-printing treatment fluid (and calendering). For example and in particular, fibrous papers or media that are relatively thin, e.g., from 20 gsm to 90 gsm, in particular can see some of the greatest improvement in flatness when used with the inkjet printers, methods, and fluid sets of the present disclosure. In one example, rolls of media that are used for printing books, newspapers, magazines, and the like, e.g., low weight paper can benefit from the printers, methods, and fluid sets described herein.

In some examples, the media can include a base substrate material and a coating or layer of an ink receiving material applied to a surface of the base substrate. For example, the base substrate material may be paper-based and an ink receiving coating may be applied on one or both major sides of the paper base substrate, for example during paper manufacturing. The ink receiving coating may comprise one or more of an inorganic metallic salt, a binder, a filler, or an additive. The media may smooth or rough, porous or nonporous, or have any shape suitable for a given printer, e.g., sheets, rolls, etc.

The inkjet printers, methods, and fluid sets described herein are used with inkjet inks. For example, with the inkjet printer, the inkjet printhead can be fluidly coupled to a preloaded inkjet ink, or the inkjet ink can be provided separately and then fluidly coupled to the printhead prior to use. Furthermore, the inkjet inks can be a pigment-based inks or dye-based inks, and typically include water and organic co-solvent. Surfactant, latex, viscosity modifier, biocide, sequestering agent, humectant, and/or other additives can likewise be present.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, or the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol, and/or 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; LEG-1; or sodium dodecylsulfate.

Consistent with the inkjet inks of this disclosure, various other additives can be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and/or buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

Figure 4:
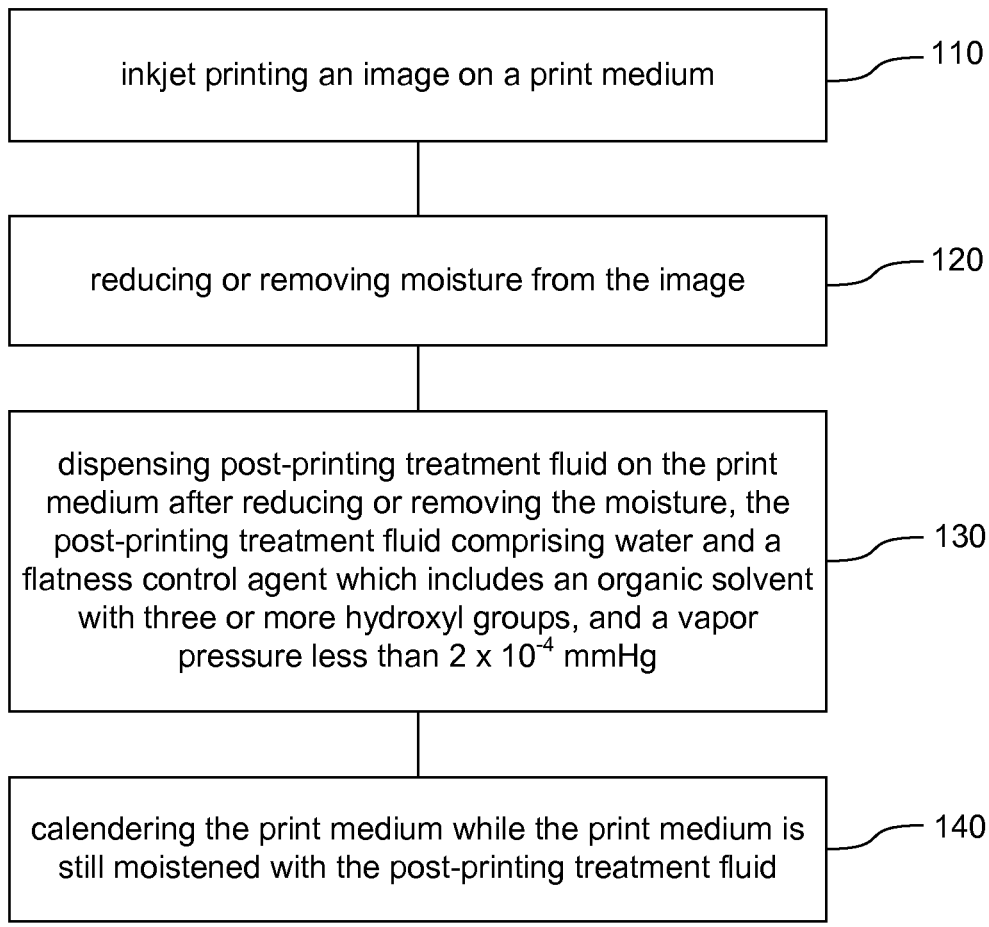
FIG. 4 illustrates a flow chart of a method of printing in accordance with examples of the present disclosure.

Returning now to the FIGS., as mentioned, in addition to the inkjet printer, a method of printing is illustrated in FIG. 4, and can include steps of printing 110 an image on a print medium, and reducing 120 moisture from the image. The inkjet inks described herein can be used to print the images, for example. The method can further include dispensing 130 post-printing treatment fluid on the print medium after reducing or removing the moisture. The post-printing treatment fluid can include water and a flatness control agent which includes an organic solvent with three or more hydroxyl groups, and a vapor pressure less than $2\times10^{-4}$ mmHg. The method can also include calendering 140 the print medium while the print medium is still moistened with the post-printing treatment fluid.

Figure 5:
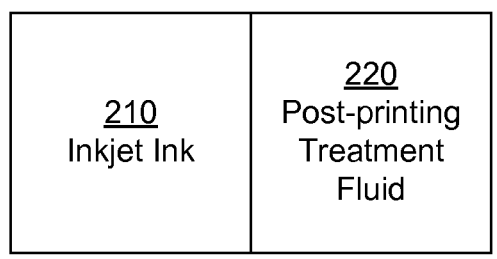
FIG. 5 illustrates a fluid set in accordance with examples of the present disclosure.

Also, in addition to the inkjet printer, a fluid set for inkjet printing is illustrated in FIG. 5, and can include an inkjet ink 210, such as an inkjet ink described herein, and a post-printing treatment fluid 220. The post-printing treatment fluid can include water and a flatness control agent. The flatness control agent can include an organic solvent with three or more hydroxyl groups, and a vapor pressure less than $2\times10^{-4}$ mmHg.

It is noted that, as used in this specification and the appended claims, the singular forms "a," "an," and "the" include plural referents unless the content clearly dictates otherwise.

When referring to "high speed" as it related to a digital printing press, presses such as the HP T200 Web Press® or the HP T300 Web Press® exhibit printing speeds that are commensurate of what is considered to be "high speed." For example, the HP T300 Web Press® can print text and/or other images on media at a rate of 400 feet per minute. This capability would be considered high speed. In another example, and more generally, printing at 100 feet per minute would also be considered high speed.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

The following example illustrates some benefits of the inkjet printers, methods, and fluid sets of the present disclosure. However, it is to be understood that the following are only exemplary or illustrative. Numerous modifications and alternative compositions, systems, and methods may be devised without departing from the spirit and scope of the present disclosure. The appended claims are intended to cover such modifications and arrangements. Thus, while the examples have been described above with particularity, the following provide further detail in connection with what are presently deemed to be the acceptable examples.

Example

A light weight coated paper print medium was obtained that had a media weight of about 67 gsm. The print medium was inkjet printed with image having ink coverage of about 25% on portions of the print medium. After printing, the imaged print medium was dried at 120° C. for 2 to 4 seconds. Noticeably, the imaged print medium was observed to have significant cockling and waviness.

A post-printing treatment fluid was prepared that included 95 wt % water and 5 wt % 2-ethyl-2-(hydroxymethyl)-1,3-propanediol (EHPD). The post-printing treatment fluid was applied to certain samples of the imaged print medium, and then the print medium was lightly calendered at 800 psi. Other samples were processed differently to evaluate the added benefit provided by the post-printing treatment fluid, as outlined in Table 1 below:

TABLE 1

| Sample | Fluid Applied After Printing and Drying | Calender Pressure and Temperature | Flatness Rank |
|---|---|---|---|
| 0 | None | None | 1 |
| 1 | None | 800 psi at RT | 2 |
| 2 | 2 gsm water | 800 psi at RT | 2 |
| 3 | 0.05 gsm EHPD (5% solution in water) | 800 psi at RT | 4 |
| 4 | 0.2 gsm EHPD (5% solution in water) | 800 psi at RT | 4 |
| 5 | 0.05 gsm EHPD (5% solution in water) | None | 3 |

RT = Room Temperature, i.e. 21° C.
Flatness Ranking:
5 = no waviness;
4 = very flat with only very slight waviness;
3 = some waviness but minimally acceptable;
2 = unacceptable waviness; and
1 = a significant waviness and cockling or even wrinkles (essentially original or similarly poor condition).

While the disclosure has been set forth with reference to certain example, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An inkjet printer, comprising:
   an inkjet printhead to print an image on a print medium;
   a dryer to reduce or remove moisture from the image;
   a post-printing treatment fluid comprising water and a flatness control agent, the flatness control agent comprising an organic solvent with three or more hydroxyl groups, and a vapor pressure less than $2 \times 10^{-4}$ mmHg;
   a fluid dispenser to apply the post-printing treatment fluid on the print medium after the moisture from the image is reduced or removed; and
   a mechanical calendering device to apply pressure to the print medium after application and while the print medium is still moistened by the post-printing treatment fluid.

2. The inkjet printer of claim 1, wherein the flatness control agent in the post-printing treatment fluid is present at a concentration from 1 wt % to 15 wt %.

3. The inkjet printer of claim 1, wherein the post-printing treatment fluid consists essentially of the water and the flatness control agent, and wherein the flatness control agent in the post-printing treatment fluid is at a concentration from 2 wt % to 8 wt %.

4. The inkjet printer of claim 1, wherein the mechanical calendering device includes rollers that apply pressure at from 500 psi to 3000 psi.

5. The inkjet printer of claim 1, wherein the mechanical calendering device also applies heat at from greater than room temperature to 150° C.

6. The inkjet printer of claim 1, further comprising a second dryer positioned inline after the mechanical calendering device.

7. The inkjet printer of claim 1, where the inkjet printer is a high-speed web press configured to print at a print medium feed rate of at least 100 feet per minute.

8. A method of printing, comprising:
   inkjet printing an image on a print medium;
   reducing or removing moisture from the image;
   dispensing post-printing treatment fluid on the print medium after reducing or removing the moisture, the post-printing treatment fluid comprising water and a flatness control agent which includes an organic solvent with three or more hydroxyl groups, and a vapor pressure less than $2 \times 10^{-4}$ mmHg; and
   calendering the print medium while the print medium is still moistened with the post-printing treatment fluid.

9. The method of claim 8, wherein the flatness control agent in the post-printing treatment fluid is present at a concentration from 1 wt % to 15 wt %.

10. The method of claim 8, wherein the step of calendering includes applying from about 500 psi to 3000 psi pressure to the print medium.

11. The method of claim 8, further comprising applying heat to the print medium at from greater than room temperature to 150° C. while calendering the print medium.

12. The method of claim 8, further comprising drying the print medium after calendering.

13. The method of claim 9, where the step of printing is at a print medium feed rate of at least 100 feet per minute.

14. The method of claim 9, wherein the amount of the post-printing treatment fluid dispensed provides a dry coat weight on the print medium at from about 0.01 gsm to about 5.0 gsm.

15. A fluid set for inkjet printing, comprising:
   an inkjet ink; and
   a post-printing treatment fluid comprising water and a flatness control agent, the flatness control agent comprising an organic solvent with three or more hydroxyl groups, and a vapor pressure less than $2 \times 10^{-4}$ mmHg.

* * * * *